(12) United States Patent
Chen (10) Patent No.: US 11,689,552 B2
(45) Date of Patent: *Jun. 27, 2023

(54) MULTI-TENANT CLOUD SECURITY THREAT DETECTION

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/080,119

(22) Filed: Oct. 26, 2020

(65) Prior Publication Data
US 2021/0058419 A1 Feb. 25, 2021

Related U.S. Application Data

(63) Continuation of application No. 16/414,070, filed on May 16, 2019, now Pat. No. 10,819,728, which is a (Continued)

(51) Int. Cl.
*H04L 9/40* (2022.01)

(52) U.S. Cl.
CPC ...... *H04L 63/1425* (2013.01); *H04L 63/1416* (2013.01); *H04L 63/1441* (2013.01);
(Continued)

(58) Field of Classification Search
CPC ............. H04L 63/1425; H04L 63/1416; H04L 63/1441; H04L 63/1458; H04L 63/1483; H04L 63/20
See application file for complete search history.

(56) References Cited

U.S. PATENT DOCUMENTS 6,567,796 B1 * 5/2003 Yost .................... H04L 41/5067
6,601,234 B1 * 7/2003 Bowman-Amuah ........................
G06Q 10/06375
717/107

(Continued)

OTHER PUBLICATIONS

Aaron Newman, Hackproof Your Cloud—Responding to 2016 Threats; https://www.slideshare.net/AmazonWebServices/hackproof-your-cloud-responding-to-2016-threats-aws-public-sector-summit-2016; retrieved Apr. 12, 2019.

(Continued)

*Primary Examiner* — David Garcia Cervetti
(74) *Attorney, Agent, or Firm* — K&L Gates LLP (57) ABSTRACT

Methods and systems for security threat detection are disclosed. For example, a virtual machine with a network interface of a plurality of virtual machines includes a plurality of applications including first and second applications. The plurality of applications is associated with a respective plurality of application security modules, including a first and second application security modules associated with the first and second applications. A security policy engine executes on a processor in communication with a network including a network controller. The application security module detects an abnormality with a request to the first application, identifies a source and a mode of the abnormality, and reports the source and the mode to the security policy engine. The security policy engine prevents a further abnormality with the source and/or the mode from affecting the second application and commands the network controller to prevent the source from interacting with the network.

20 Claims, 5 Drawing Sheets

Related U.S. Application Data continuation of application No. 15/353,288, filed on Nov. 16, 2016, now Pat. No. 10,298,605.

(52) U.S. Cl.
CPC ...... *H04L 63/1458* (2013.01); *H04L 63/1483* (2013.01); *H04L 63/20* (2013.01)

(56) References Cited

U.S. PATENT DOCUMENTS

| | | | | |
|---|---|---|---|---|
| 7,475,032 | B1* | 1/2009 | Patnode | G06Q 40/06 705/36 R |
| 7,603,301 | B1* | 10/2009 | Regan | G06Q 10/10 705/30 |
| 7,774,271 | B1* | 8/2010 | Edwards | G06Q 20/10 705/38 |
| 8,499,348 | B1* | 7/2013 | Rubin | H04L 63/20 726/25 |
| 8,578,376 | B2* | 11/2013 | Natchadalingam | G06F 9/45533 718/1 |
| 8,601,367 | B1* | 12/2013 | Ritz | G06Q 40/00 715/234 |
| 8,601,583 | B1* | 12/2013 | Chandrasekhar | G06F 21/54 726/24 |
| 8,769,622 | B2 | 7/2014 | Chang et al. | |
| 8,850,512 | B2* | 9/2014 | Price | G06F 21/577 718/1 |
| 8,914,406 | B1* | 12/2014 | Haugsnes | G06F 16/23 710/316 |
| 8,918,785 | B1* | 12/2014 | Brandwine | G06F 9/455 718/1 |
| 8,949,825 | B1* | 2/2015 | Fitzgerald | G06F 9/45537 718/1 |
| 9,092,248 | B1* | 7/2015 | Makin | G06F 9/45558 |
| 9,223,966 | B1* | 12/2015 | Satish | G06F 9/45558 |
| 9,223,972 | B1* | 12/2015 | Vincent | H04L 63/1425 |
| 9,424,333 | B1* | 8/2016 | Bisignani | G06F 3/0482 |
| 9,438,634 | B1* | 9/2016 | Ross | H04L 63/02 |
| 9,467,476 | B1* | 10/2016 | Shieh | G06F 21/554 |
| 9,489,410 | B1* | 11/2016 | Turner | G06F 16/9535 |
| 9,495,194 | B1* | 11/2016 | Twitchell, Jr. | G06F 3/067 |
| 9,503,475 | B2* | 11/2016 | Fadida | H04L 67/34 |
| 9,652,617 | B1* | 5/2017 | Evans | G06F 21/6245 |
| 9,703,956 | B1* | 7/2017 | Watson | G06F 21/562 |
| 9,710,386 | B1* | 7/2017 | Zhang | G06F 9/5016 |
| 9,792,782 | B1* | 10/2017 | Basu | G07F 19/203 |
| 9,823,857 | B1* | 11/2017 | Pendharkar | G06F 3/0613 |
| 9,824,216 | B1* | 11/2017 | Khalid | G06F 21/554 |
| 9,930,012 | B1* | 3/2018 | Clemons, Jr. | H04L 63/0272 |
| 9,990,500 | B2* | 6/2018 | Muthurajan | H04L 63/1433 |
| 10,037,276 | B1* | 7/2018 | Dalal | G06F 11/36 |
| 10,055,231 | B1* | 8/2018 | Li | G06F 9/5077 |
| 10,360,371 | B1* | 7/2019 | Watson | G06F 21/50 |
| 10,382,476 | B1* | 8/2019 | Li | H04L 63/10 |
| 10,417,432 | B2* | 9/2019 | Mahaffey | H04L 63/166 |
| 10,454,950 | B1* | 10/2019 | Aziz | H04L 63/1425 |
| 10,567,420 | B2* | 2/2020 | Chantz | G06F 21/554 |
| 10,776,515 | B2* | 9/2020 | Barday | G06F 21/31 |
| 10,846,390 | B2* | 11/2020 | Subramanian | G06F 16/86 |
| 11,019,081 | B1* | 5/2021 | Rivlin | H04L 63/1441 |
| 11,068,153 | B2* | 7/2021 | Zambetti | G06F 3/0481 |
| 2002/0035628 | A1* | 3/2002 | Gil | H04L 63/1458 709/224 |
| 2003/0046209 | A1* | 3/2003 | Brandenberger | G06Q 40/06 705/36 R |
| 2003/0050936 | A1* | 3/2003 | Wainwright | G06Q 10/087 |
| 2004/0255185 | A1* | 12/2004 | Fujiyama | G06F 11/1482 714/E11.008 |
| 2005/0055239 | A1* | 3/2005 | Farmer | G06Q 10/06 705/305 |
| 2006/0095963 | A1* | 5/2006 | Crosby | G06F 21/552 726/22 |
| 2006/0236390 | A1* | 10/2006 | Matovsky | H04W 12/128 726/22 |
| 2007/0150893 | A1* | 6/2007 | Grobman | G06F 1/324 718/1 |
| 2007/0162890 | A1* | 7/2007 | Meier | G06F 21/577 717/100 |
| 2007/0174193 | A1* | 7/2007 | Quan | G06Q 20/40 705/44 |
| 2007/0226794 | A1* | 9/2007 | Howcroft | H04N 21/442 348/E5.006 |
| 2007/0244775 | A1* | 10/2007 | Linder | G06Q 40/00 705/35 |
| 2008/0047009 | A1 | 2/2008 | Overcash et al. | |
| 2008/0134175 | A1* | 6/2008 | Fitzgerald | G06F 21/53 718/1 |
| 2008/0134178 | A1* | 6/2008 | Fitzgerald | G06F 9/45537 718/1 |
| 2008/0184225 | A1* | 7/2008 | Fitzgerald | G06F 9/45558 718/1 |
| 2008/0196103 | A1* | 8/2008 | Lin | H04L 63/1416 726/24 |
| 2008/0256634 | A1* | 10/2008 | Pichler | H04L 63/145 726/23 |
| 2008/0294713 | A1* | 11/2008 | Saylor | H04L 43/00 709/202 |
| 2009/0241192 | A1* | 9/2009 | Thomas | G06F 9/5077 718/1 |
| 2009/0241194 | A1* | 9/2009 | Thomas | G06F 21/53 718/1 |
| 2009/0271865 | A1* | 10/2009 | Jiang | H04L 69/22 709/224 |
| 2009/0319440 | A1* | 12/2009 | Montgomery | G06Q 40/08 705/36 R |
| 2010/0107247 | A1* | 4/2010 | Shani | G06F 21/552 726/22 |
| 2010/0122343 | A1* | 5/2010 | Ghosh | G06F 9/45545 726/23 |
| 2010/0132053 | A1* | 5/2010 | Chishima | G06F 21/74 712/216 |
| 2010/0138316 | A1* | 6/2010 | Connors | G06F 9/451 715/752 |
| 2010/0138919 | A1* | 6/2010 | Peng | H04L 61/00 709/224 |
| 2010/0161344 | A1* | 6/2010 | Dyson | G06F 16/242 715/764 |
| 2010/0175108 | A1* | 7/2010 | Protas | H04L 63/1433 726/25 |
| 2010/0185547 | A1* | 7/2010 | Scholar | G06Q 10/06 707/754 |
| 2010/0199351 | A1* | 8/2010 | Protas | G06F 21/577 718/1 |
| 2010/0223364 | A1* | 9/2010 | Wei | H04L 67/1097 718/1 |
| 2010/0241466 | A1* | 9/2010 | Chambers | G06Q 20/10 715/810 |
| 2011/0067105 | A1* | 3/2011 | Wolfe | G06F 21/53 718/1 |
| 2011/0106581 | A1* | 5/2011 | Rohrbasser | G06Q 30/02 705/7.29 |
| 2011/0261049 | A1* | 10/2011 | Cardno | G06Q 40/04 345/419 |
| 2011/0270748 | A1* | 11/2011 | Graham, III | G06Q 20/3829 705/40 |
| 2011/0302415 | A1* | 12/2011 | Ahmad | H04L 63/08 713/168 |
| 2012/0066762 | A1* | 3/2012 | Todorovic | G06F 21/53 726/22 |
| 2012/0110578 | A1* | 5/2012 | Yang | G06F 9/45533 718/1 |
| 2012/0255012 | A1* | 10/2012 | Sallam | G06F 21/52 726/23 |
| 2012/0255017 | A1* | 10/2012 | Sallam | G06F 9/45558 726/24 |
| 2012/0324572 | A1* | 12/2012 | Gordon | H04L 63/1458 726/22 |

(56) References Cited

U.S. PATENT DOCUMENTS

| | | | |
|---|---|---|---|
| 2013/0086687 A1* | 4/2013 | Chess | G06F 21/54 726/25 |
| 2013/0111587 A1* | 5/2013 | Goel | G06F 21/577 726/25 |
| 2013/0124478 A1* | 5/2013 | Ginzburg | G06F 40/18 707/639 |
| 2013/0174246 A1* | 7/2013 | Schrecker | H04L 63/1433 726/14 |
| 2013/0238491 A1* | 9/2013 | Bouey | G06Q 20/405 705/39 |
| 2013/0238492 A1* | 9/2013 | Muthu | G06Q 20/405 705/39 |
| 2013/0305369 A1 | 11/2013 | Karta et al. | |
| 2013/0332324 A1* | 12/2013 | Mischell | G06Q 40/06 705/30 |
| 2013/0332387 A1* | 12/2013 | Mirra | G06Q 40/06 705/36 R |
| 2013/0332862 A1* | 12/2013 | Mirra | G06F 3/04842 705/36 R |
| 2014/0026231 A1* | 1/2014 | Barak | H04L 63/20 726/29 |
| 2014/0053226 A1* | 2/2014 | Fadida | H04L 63/1408 726/1 |
| 2014/0075506 A1* | 3/2014 | Davis | H04B 7/18508 726/3 |
| 2014/0122672 A1* | 5/2014 | Chen | H04L 41/0894 709/221 |
| 2014/0136381 A1* | 5/2014 | Joseph | G06Q 40/02 705/35 |
| 2014/0137180 A1* | 5/2014 | Lukacs | G06F 21/53 726/1 |
| 2014/0137255 A1* | 5/2014 | Wang | G06F 21/566 726/24 |
| 2014/0143868 A1* | 5/2014 | Shiva | G06F 21/552 726/23 |
| 2014/0150095 A1* | 5/2014 | Zhao | H04L 63/1458 726/22 |
| 2014/0230061 A1* | 8/2014 | Higbee | H04L 67/306 726/24 |
| 2014/0317677 A1* | 10/2014 | Vaidya | G06F 21/56 726/1 |
| 2014/0351233 A1* | 11/2014 | Crupi | G06F 16/24568 707/706 |
| 2015/0026767 A1* | 1/2015 | Sweet | H04L 63/20 726/1 |
| 2015/0026810 A1* | 1/2015 | Friedrichs | G06F 21/564 726/23 |
| 2015/0058619 A1* | 2/2015 | Sweet | H04L 63/0428 713/155 |
| 2015/0112866 A1* | 4/2015 | Muthu | G06Q 20/385 705/44 |
| 2015/0172321 A1* | 6/2015 | Kirti | H04L 63/1425 726/1 |
| 2015/0222656 A1* | 8/2015 | Haugsnes | H04L 63/104 726/23 |
| 2015/0269383 A1* | 9/2015 | Lang | H04L 63/20 726/1 |
| 2015/0271145 A1* | 9/2015 | Jalisatgi | H04L 63/0428 713/168 |
| 2015/0309831 A1* | 10/2015 | Powers | G06F 11/1474 718/1 |
| 2015/0319185 A1* | 11/2015 | Kirti | H04L 63/1416 726/23 |
| 2015/0326615 A1* | 11/2015 | Sinha | H04L 63/145 726/1 |
| 2015/0381641 A1* | 12/2015 | Cabrera | H04L 63/1425 726/23 |
| 2016/0048682 A1* | 2/2016 | Gou | H04W 4/00 726/22 |
| 2016/0072831 A1* | 3/2016 | Rieke | H04L 63/1433 726/1 |
| 2016/0099963 A1* | 4/2016 | Mahaffey | G06F 21/554 726/25 |
| 2016/0103923 A1* | 4/2016 | Thomas | G06F 16/9535 715/234 |
| 2016/0149933 A1* | 5/2016 | Schrader | H04L 63/1491 726/23 |
| 2016/0149937 A1* | 5/2016 | Katmor | H04L 63/0236 726/23 |
| 2016/0164890 A1* | 6/2016 | Haugsnes | G06F 16/951 726/23 |
| 2016/0164892 A1* | 6/2016 | Satish | H04L 63/0236 726/23 |
| 2016/0164897 A1* | 6/2016 | Rubin | H04L 63/1416 726/23 |
| 2016/0173508 A1* | 6/2016 | Kozlovsky | H04L 63/1416 726/24 |
| 2016/0179564 A1* | 6/2016 | Chen | G06F 9/45558 718/1 |
| 2016/0191463 A1* | 6/2016 | Mohanty | H04L 41/0803 726/11 |
| 2016/0191545 A1* | 6/2016 | Nanda | H04L 43/20 726/1 |
| 2016/0269425 A1* | 9/2016 | Shieh | H04L 63/0254 |
| 2016/0269427 A1* | 9/2016 | Haugsnes | H04L 63/145 |
| 2016/0321625 A1* | 11/2016 | Gilliam, III | G06Q 20/10 |
| 2016/0335110 A1* | 11/2016 | Paithane | G06F 9/45558 |
| 2017/0034198 A1* | 2/2017 | Powers | H04L 63/1441 |
| 2017/0063791 A1* | 3/2017 | Ross | H04L 67/51 |
| 2017/0093918 A1* | 3/2017 | Banerjee | H04L 41/0895 |
| 2017/0134405 A1* | 5/2017 | Ahmadzadeh | G06F 21/554 |
| 2017/0134407 A1* | 5/2017 | Mason | H04L 63/1416 |
| 2017/0149804 A1* | 5/2017 | Kolbitsch | H04L 63/1416 |
| 2017/0212807 A1* | 7/2017 | Ding | G06F 11/1438 |
| 2017/0214679 A1* | 7/2017 | Lin | H04L 63/083 |
| 2017/0223033 A1* | 8/2017 | Wager | H04L 61/5007 |
| 2017/0235951 A1* | 8/2017 | Harrison | G06F 21/51 726/24 |
| 2017/0245217 A1* | 8/2017 | Kim | H04W 52/0264 |
| 2017/0251013 A1* | 8/2017 | Kirti | H04L 63/1441 |
| 2017/0255505 A1* | 9/2017 | Qi | G06F 11/0754 |
| 2017/0310702 A1* | 10/2017 | Chantz | H04L 63/1441 |
| 2017/0329966 A1* | 11/2017 | Koganti | G06F 21/56 |
| 2018/0024537 A1* | 1/2018 | Chauvet | G06F 9/50 718/104 |
| 2018/0034824 A1* | 2/2018 | Maycotte | G16H 10/60 |
| 2018/0062929 A1* | 3/2018 | Maskalik | H04L 41/0806 |
| 2018/0063176 A1* | 3/2018 | Katrekar | H04L 43/10 |
| 2018/0063193 A1* | 3/2018 | Chandrashekhar | G06F 15/177 |
| 2018/0089258 A1* | 3/2018 | Bhattacharjee | G06F 16/24535 |
| 2018/0089259 A1* | 3/2018 | James | G06F 16/2425 |
| 2018/0089262 A1* | 3/2018 | Bhattacharjee | G06F 16/24535 |
| 2018/0089269 A1* | 3/2018 | Pal | G06F 16/24542 |
| 2018/0089278 A1* | 3/2018 | Bhattacharjee | H04L 69/22 |
| 2018/0089306 A1* | 3/2018 | Pal | G06F 16/24535 |
| 2018/0262522 A1* | 9/2018 | Zhou | G06F 16/128 |
| 2019/0124042 A1* | 4/2019 | Thomas | H04L 63/1408 |
| 2019/0281080 A1* | 9/2019 | Chen | H04L 63/1441 |
| 2019/0297096 A1* | 9/2019 | Ahmed | H04L 63/1441 |
| 2019/0303586 A1* | 10/2019 | Mahaffey | H04L 63/1408 |
| 2019/0311134 A1* | 10/2019 | Mahaffey | H04W 12/02 |
| 2020/0097665 A1* | 3/2020 | Mahaffey | G06F 21/554 |
| 2022/0166794 A1* | 5/2022 | Thomas | H04L 63/1416 |

OTHER PUBLICATIONS

Observable.net, blog, Security in the Cloud Responding to AWS Threats in real time, by Ron Sterbenz, Sep. 13, 2016, Data Security Technology.

* cited by examiner

Fig. 5

US 11,689,552 B2

MULTI-TENANT CLOUD SECURITY THREAT DETECTION

PRIORITY CLAIM AND CROSS-REFERENCE TO RELATED APPLICATIONS

The present application is a continuation application of U.S. patent application Ser. No. 16/414,070, filed on May 16, 2019, which is a continuation application of U.S. patent application Ser. No. 15/353,288, filed on Nov. 16, 2016, the entire contents of which are hereby incorporated by reference herein.

BACKGROUND

The present disclosure generally relates to improving network security threat detection and response in multi-tenant cloud environments. Typically, a multi-tenant cloud provider hosts many applications on many virtual machines belonging to many different tenants. The cloud provider may track traffic to and from the tenants, virtual machines and applications, and may track the ebb and flow of traffic. Virtual machines may allow a programmer to quickly scale the deployment of applications to the volume of traffic requesting the applications. Virtual machines may be deployed in a variety of hardware environments. There may be economies of scale in deploying hardware in a large scale. A cloud provider may rent or sell excess computing capacity on extra hardware deployed to, for example, achieve per unit cost savings on hardware, or for the express purpose of creating a revenue stream from such rentals. A programmer may hire one or more cloud providers to provide contingent space for situations where the programmer's applications may require extra compute capacity, becoming a tenant of the cloud provider. A tenant may flexibly launch more or less copies virtual machines and more or less copies of applications in response to the ebb and flow of traffic. The cloud provider may be unaware of the specific contents of the traffic, for example, due to contractual privacy terms or encryption. A tenant is generally responsible for authentication services for the applications owned by the tenant. A tenant is also typically aware of the contents of any traffic handled or generated by the tenant's applications.

SUMMARY

The present disclosure provides a new and innovative system, methods and apparatus for security threat detection. In an example, a plurality of virtual machines includes at least a virtual machine which includes a plurality of applications including at least a first application and a second application. Each of the first plurality of applications is associated with a respective plurality of application security modules, including at least a first application security module associated with the first application and a second application security module associated with the second application. In the example, the virtual machine has a network interface connecting the virtual machine to a network that includes a network controller in communication with one or more processors and a security policy engine executing on the one or more processors. In the example, the first application security module detects an abnormality with a request to the first application, identifies a source and a mode of the abnormality and reports the source and the mode to the security policy engine. After receiving a report with the source and the mode from application security module, the security policy engine prevents a further abnormality with the source and/or the mode from affecting the second application and commands the network controller to prevent the source from interacting with the network.

Additional features and advantages of the disclosed method and apparatus are described in, and will be apparent from, the following Detailed Description and the Figures.

DETAILED DESCRIPTION OF EXAMPLE EMBODIMENTS

In computer systems, isolated guests such as virtual machines may be used for creating hosting environments for running application programs. In an example, a programmer may use a container based virtualization system such as Red Hat® OpenShift® or Docker®, or a system where stand alone virtualized operating systems are created including the use of a hypervisor. To provide access to the applications hosted on the virtual machines or containers to the public, the public IP addresses of these isolated guests may be available for public access, possibly presenting avenues for malicious actors to exploit these applications, potentially resulting in damage to these virtual machines or containers hosting the applications, including possibly allowing these isolated guests to be taken over by the malicious actors. In an example, multiple applications and/or isolated guests owned by the same programmer or tenant on a public cloud may have elevated access to other applications and/or isolated guests owned by the same tenant. After breaching the security on one application and/or isolated guest, a malicious actor could in turn more easily attack other components owned by the same tenant.

Cloud providers and their tenants may both implement security measures to prevent and/or limit damage caused by malicious actors. In an example, a cloud provider may use certain heuristics to use a network controller to throttle network traffic to its tenants' applications if a sudden surge in traffic is detected, a surge in traffic being a sign of a denial of service attack. However, in the example, the cloud provider may not be able to distinguish between a real surge in traffic, caused by (e.g., a promotion being run by a e-commerce website or a hot news story on a news site), from a malicious attack (e.g., bad actors trying to shut down the e-commerce website or news site as a protest).

Meanwhile, tenants typically know what traffic is entering their systems, and may react appropriately. In an example, each tenant application may be associated with an application security module, for example, a Plugin Authentication Module (PAM) such as Linux® PAM that is able to recognize and filter unauthorized access to applications and/or services such as secure shell (SSH), Hypertext Transfer Protocol (HTTP), remote file system (e.g., FTP), and other means that allow computer systems to connect and interact. However, each PAM is typically responsible for monitoring one application or service at a time. Accordingly, for example, a sophisticated attack may attempt to exploit multiple different applications simultaneously, and may then leverage a successful attack against one application into an attack on another application. In an example, an application security module that detects an abnormality in one application may protect that application but still leave other applications vulnerable. In the example, the application security module may not be authorized to interact with the network controller of the cloud provider capable of implementing wider area protection. In another example, the application security module may be one of hundreds or thousands of application security modules actively monitoring the tenant's applications, and these applications and their associated application security modules may be dynamically launched. In such an example, it would be difficult for a light weight module like a PAM to be able to account for the other application security modules of the tenant operating in the cloud, and a distribution of suspected threat information to many other PAMs simultaneously would cause a lot of network traffic and a lot of potential noise. Therefore, in many examples, individual application security modules may not be aware of threats detected by other application security modules. For example, a tenant may have a secure shell SSH application authenticating system access and an email application running on the same virtual machine, and a PAM associated with the SSH application may not know to notify the email application that a malicious actor has repeatedly attempted to guess the password of an administrator account.

The problem that arises, then, is that the cloud provider's network controller, which may be capable of powerful enforcement techniques such as blocking a source of traffic such as an internet protocol (IP) address or a media access control (MAC) address from communicating with the network, may be incapable of making accurate threat detections for the cloud provider's tenants, but a specialized threat detection application such as an application security module, may be incapable of reacting to a detected threat with a sufficiently robust response to impede the threat.

The present disclosure aims to address problems with deficiencies in the detection of and response to security threats in multi-tenant clouds by introducing a security policy engine utilized by a tenant as an interpreter between an application security module and other components capable of protecting the tenant's applications from further threats. For example, a security policy engine may receive a report of an abnormality in traffic from a certain IP address, and correlate this report to another abnormality reported by a different application security module with a different IP address but the same MAC address, and then the security policy engine may use the network controller's application programing interface (API) to block the whole subnet of IP addresses where attacks have originated and also the MAC address from interacting with the network. The security policy engine may also have access to block a user's access to multiple other applications when an application security module detects login issues with the user's account such as multiple failed password attempts or multiple accesses to the same account from different sources. In an example, the security policy engine may greatly enhance security threat response time on a network wide basis, while also enhancing flexibility for a tenant since the security policy engine may be capable of migrating from one cloud provider to another, and thereby allowing the same applications with the same application security modules to be equally protected on different cloud environments with different network controller APIs. The problem of cross communication between application security modules is also solved, because rather than each application security module being required to keep an updated list of all of the other deployed application security modules, each new application security module is only required to know the addresses of any security policy engines to raise a system wide alarm.

Figure 1:
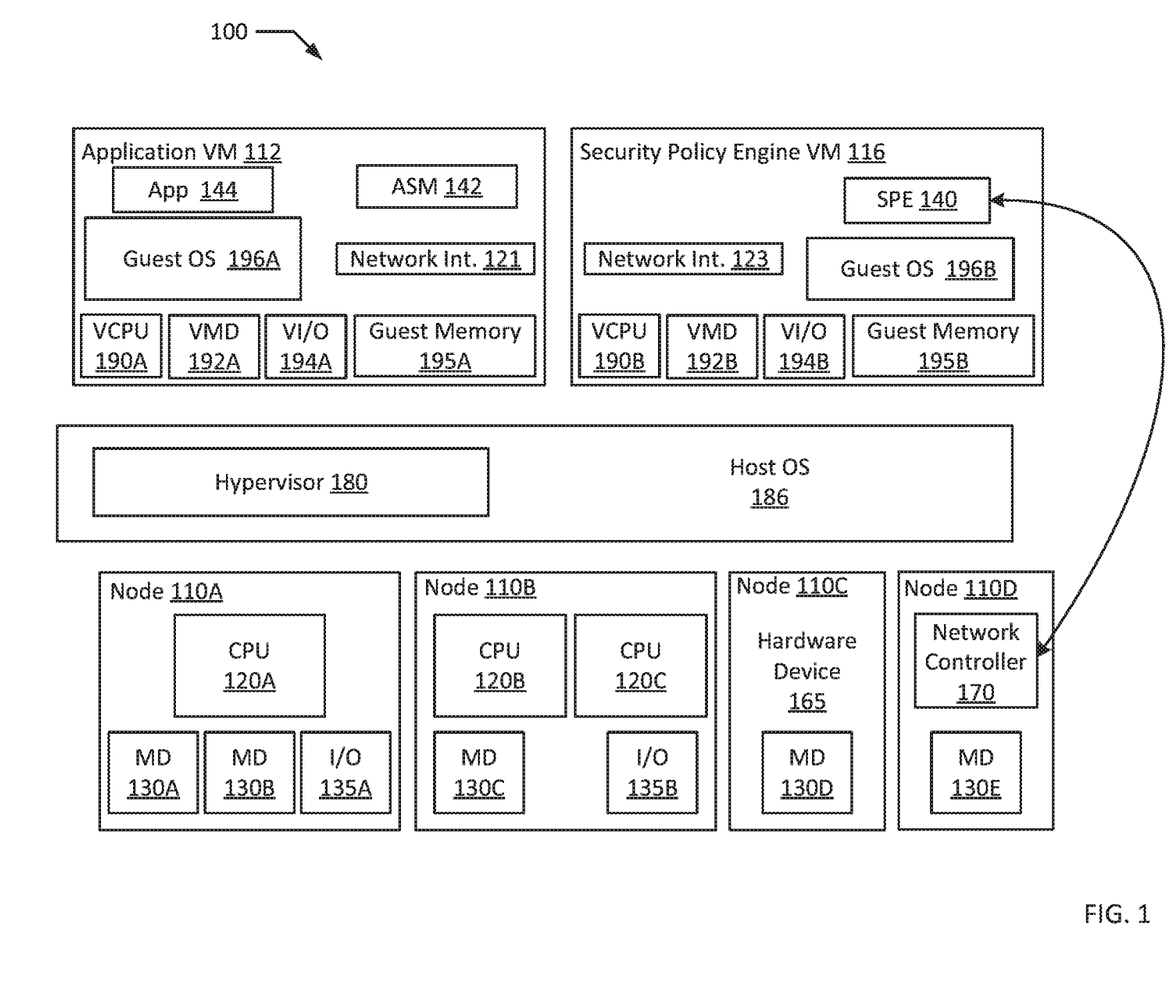
FIG. 1 is a block diagram of a security policy engine system according to an example of the present disclosure.

FIG. 1 depicts a block diagram of a security policy engine system according to an example of the present disclosure. The system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 135A-B). Each node 110C-D may include a hardware device (e.g., hardware device 165 and network controller 170) and a memory device 130D-E. In an example, a hardware device (e.g., 165) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, graphics cards etc. The hardware device 165 and the network controller 170 may be communicatively coupled to respective memory devices 130D-E.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and/or between a processor 120A and an I/O device 135A may be provided by one or more local buses of suitable architecture, for example, peripheral component interconnect (PCI). In an example, the above mentioned components may be infrastructure owned and operated by a cloud provider, for example, used to host isolated guests including virtual machines (VMs) and/or containers operated by the cloud provider's tenants.

System 100 may run one or more virtual machines 112 and 116, by executing a software layer (e.g., hypervisor 180) above the hardware and below the virtual machines 112 and 116, as schematically shown in FIG. 1. In an example, the hypervisor 180 may be a component of the host operating system 186 executed by the system 100. In another example, the hypervisor 180 may be provided by an application running on the operating system 186, or may run directly on the system 100 without an operating system beneath it. The hypervisor 180 may virtualize the physical layer, including processors, memory, and I/O devices, and present this virtualization to virtual machines 112 and 116 as devices, including virtual processors 190A-B, virtual memory devices 192A-B, and/or virtual I/O devices 194A-B.

In an example, a virtual machine 112 may execute a guest operating system 196A which may utilize the underlying virtual central processing unit ("VCPU") 190A, virtual memory device ("VIVID") 192A, and virtual input/output ("VI/O") devices 194A. One or more applications 142 and 144 may be running on a virtual machine 112 under the respective guest operating system 196A. Processor virtualization may be implemented by the hypervisor 180 scheduling time slots on one or more physical processors 120A-C such that from the guest operating system's perspective those time slots are scheduled on a virtual processor 190A. In an example, application 142 may be an application security module ("ASM") such as a PAM associated with application 144.

A virtual machine 112 may run on any type of dependent, independent, compatible, and/or incompatible applications on the underlying hardware and OS 186. In an example, applications 142 and 144 running on virtual machine 112 may be dependent on the underlying hardware and/or OS 186. In another example, applications 142 and 144 running on virtual machine 112 may be independent of the underlying hardware and/or OS 186. Additionally, applications 142 and 144 running on virtual machine 112 may be compatible with the underlying hardware and/or OS 186. In an example, applications 142 and 144 running on virtual machine 112 may be incompatible with the underlying hardware and/or OS. In an example, a device may be implemented as a virtual machine 112. The hypervisor 180 manages memory for the host operating system 186 as well as memory allocated to the virtual machine 112 and guest operating systems 196A such as guest memory 195A provided to guest OS 196. In an example, virtual machine 112 has a network interface 121 that is capable of communicating with both an internal network communicating with other systems operated by the tenant and also the public internet.

In an example, security policy engine VM 116 may be another virtual machine similar in configuration to virtual machine 112, with VCPU 190B, VIVID 192B, VI/O 194B, guest memory 195B, guest OS 196B and network interface 123 operating in similar roles to their respective counterparts in virtual machine 112. The security policy engine VM 116 may host security policy engine 140 as an application running on security policy engine VM 116, in communication with network interface 123. In an example, security policy engine 140 may be in communication with network controller 170. In other examples, security policy engine 140 may be executing on virtual machine 112 or any other virtual machine, or security policy engine 140 may be executing on a host OS 186, or directly on any of nodes 110A-D. In an example, virtual machines 112 and 116 are virtual machines operated by a tenant, for example, renting computing time and space from a cloud provider operating nodes 110A-D. In an example, the applications executing on virtual machines 112 and 116 may be executing on containers instead of virtual machines, for example, without the use of a hypervisor 180. One of the advantages of security policy engine 140 is that security policy engine 140 may be configured to operate on any infrastructure with the required computational and network capacity to support security policy engine 140.

Figure 2:
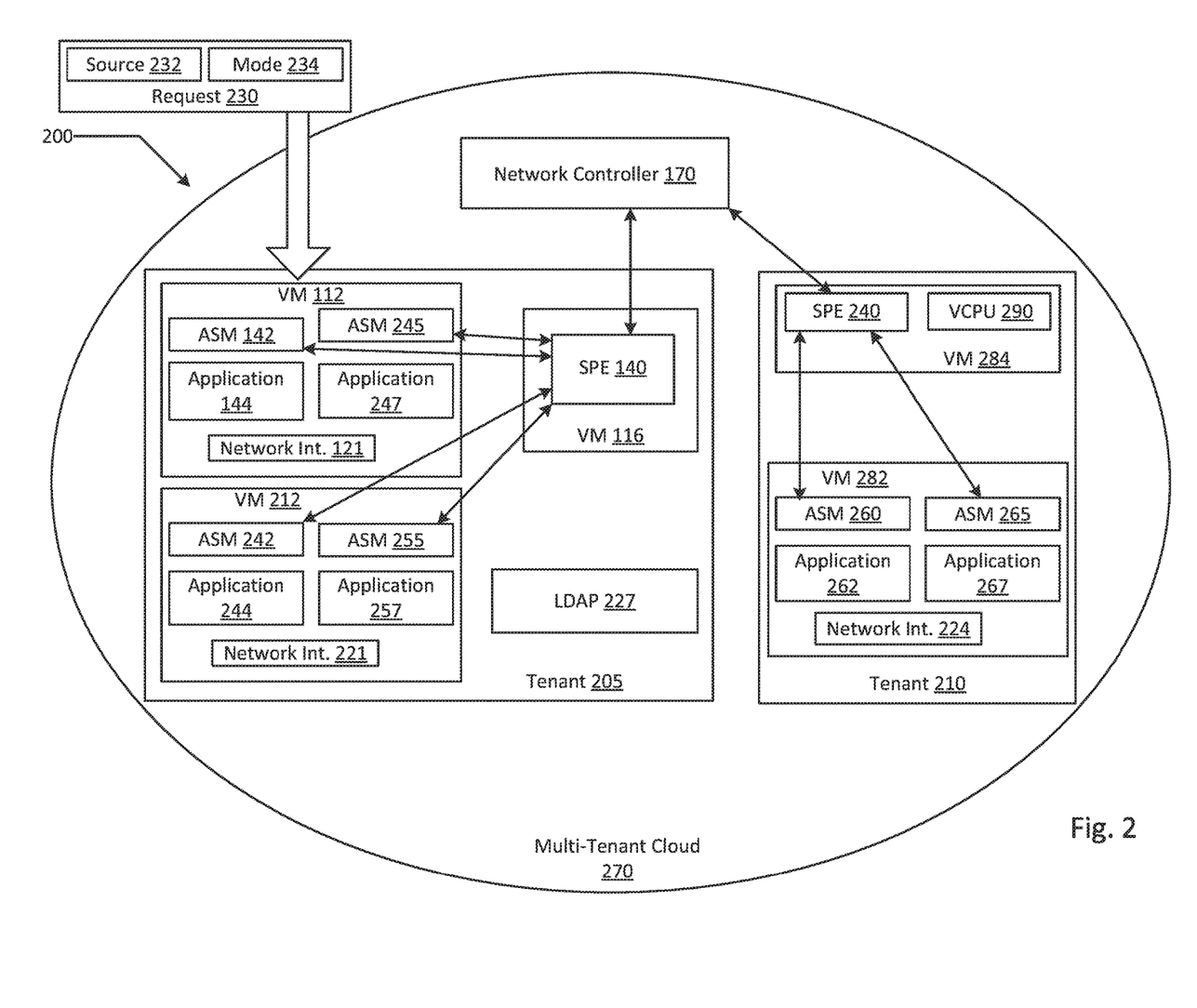
FIG. 2 is a block diagram illustrating an example of a security policy engine system in a multi-tenant cloud according to an example of the present disclosure.

FIG. 2 depicts a block diagram illustrating an example of a security policy engine system in a multi-tenant cloud according to an example of the present disclosure. In an example, tenants 205 and 210 are two tenants of multi-tenant cloud 270, for example, Amazon Web Services® available from Amazon.com®, Inc. and Rackspace® Public Cloud available from Rackspace®, Inc. In the example, tenants 205 and 210 may be any entity that utilizes the multi-tenant cloud to host web services. For example, Red Hat® Inc. may contract with Amazon Web Services® to allow Red Hat® Inc. to host a website on Amazon Web Services® or to host a disaster relief or capacity overflow contingency version of the website on Amazon Web Services®.

In an example, tenant 205 may host a collection of virtual machines and containers in multi-tenant cloud 270, including virtual machines 112, 116, and 212. In the example, virtual machine 112 may host application 144 associated with application security module 142, and application 247 associated with application security module 245, communicating with the rest of the system through network interface 121. In addition, virtual machine 212 may host, for example, application 257 associated with application security module 255, along with a second copy of application 144 (this copy labeled as application 244), associated with application security module 242, the virtual machine 212 connecting to the rest of the system through network interface 221. In an example, all of the application security modules for tenant 205 (e.g., ASM 142, 245, 242, 255) may be in communication with security policy engine 140 executing on virtual processor 190B on virtual machine 116. In an example, a Lightweight Directory Access Protocol (LDAP) system 227 may be executing on a node operated by tenant 205 to provide authentication services for tenant 205's other applications. In an example, the security policy engine 140 is in communication with LDAP 227 and may alter the permissions for accounts and groups stored in LDAP 227 in response to assessed security threats. In an example, security policy engine 140 may also be in communication with network controller 170, and may, in an example, update network controller 170 through an application programming interface in response to assessed security threats.

In an example, there is another tenant, tenant 210, in the multi-tenant cloud 270. Tenant B 210 may operate its own isolated guests, for example, VM 282 hosting applications 262 and 267 with associated application security modules 260 and 265. In an example, VM 282 may communicate with other systems via network interface 224, particularly, application security modules 260 and 265 may communicate with a security policy engine 240 executing on VCPU 290 in VM 284. In an example, security policy engine 240 is also in communication with network controller 170.

An example request 230 may be received by VM 112 to, for example, execute application 144. In an example, request 230 may be associated with a source 232 and a mode 234, each of which may be associated with characteristics. Source 232 may, for example, have characteristics such as an IP address, a MAC address, a physical location, a phone number, a domain, and a subnet. Mode 234 may, for example, have characteristics such as a type of request or a type of abnormality triggering a report from application security module 142 to security policy engine 140. In an example, the mode 234 may include a traffic surge, an invalid login credential, a login from an unknown device, identified malware, a phishing attempt, a password attack, a denial-of-service attack, a cross site scripting attempt, a SQL injection attempt, a local file inclusion attempt, and a remote file inclusion attempt.

Figure 3:
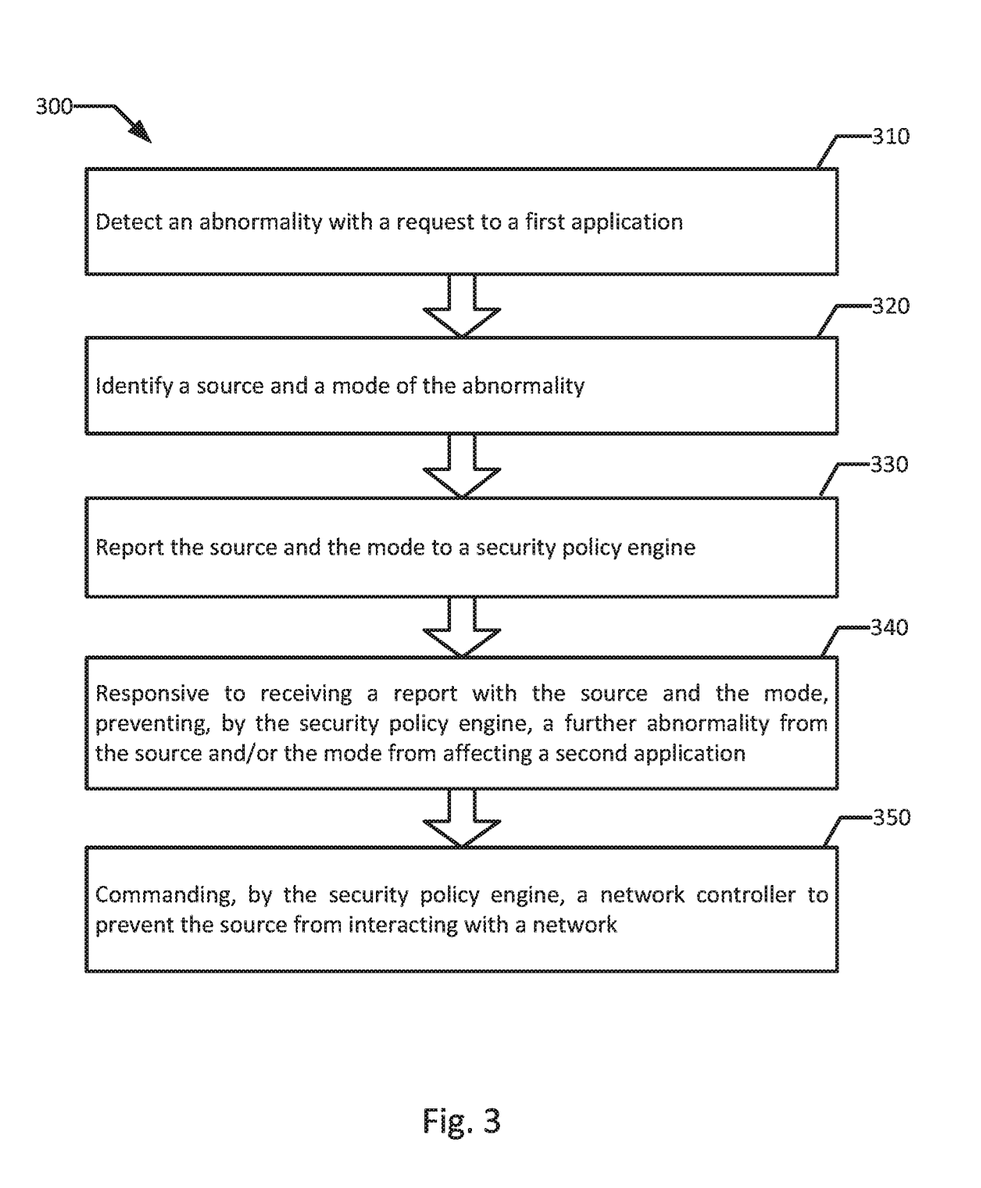
FIG. 3 is a flowchart illustrating an example of security threat detection and response according to an example of the present disclosure.

FIG. 3 depicts a flowchart illustrating an example of security threat detection and response according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by an application security module 142 and a security policy engine 140.

In an example, an abnormality is detected with a request to the first application (block 310). In illustrated example 200, application security module 142 may detect an abnormality with request 230, which may be, for example, a request to access email application 144. In an example, request 230 may originate from outside of the multi-tenant cloud 270; for example, request 230 may be a request from the public internet. In some examples, application security module 142 may reject, or instruct application 144 to reject, the request 230 after detecting the abnormality with the request. In an example, an abnormality may be a component within a request. For example, a request may be a message including a source (e.g., IP address or MAC address), a timestamp and a body (e.g., the contents of the request), and an abnormality may be any of these components of the request. In an example, an abnormality could be a portion of the contents of a request in a case where there is malicious code embedded in the body of the request to load a webpage. In such an example, a single request may be flagged and reported as an abnormality by an application security module. In another example, an abnormality may be a completely benign and ordinary component of an individual request, but nevertheless be flagged as an abnormality in a broader context. For example, an abnormality may be a component present in many requests. In an example example, an unusual volume of requests from a particular source or of a particular type, such as an unusual number of requests to add the same item to a shopping cart, or an unusual volume of requests from the same IP address, may cause the type or IP address of a subsequent request to be flagged as an abnormality. In an example, a timestamp of a request may also be an abnormality if a wide variety of requests are received within a certain time window. In yet another example, an abnormality may be a login attempt by a certain login credential after a number of failed login attempts from that login credential. In some examples, an abnormality may not be malicious. In an example, a large number of requests may be received at the same time to buy an item priced incorrectly. In another example, a large number of requests may be received from the same IP address due to a malfunctioning program.

A source and a mode of the abnormality are identified (block 320). In an example, the application security module 142 may detect and/or track a source 232 and a mode 234 of the abnormality. In an example, the source 232 may be an IP address used for sending the request 230. In another example, the source 232 may be any other identifier as to the location where the request 230 may originate from. In an example, the source may include IP address, a MAC address, a physical location, a phone number, a domain, and a subnet. In an example, the mode 234 may include any type of abnormality flagged in request 230 and characteristics of request 230 that trigger a report of the abnormality from application security module 142 to security policy engine 140. For example, the mode 234 may include types of traffic such as a traffic surge, an invalid login credential, a login from an unknown device, identified malware, a phishing attempt, a password attack, a denial-of-service attack, a cross site scripting attempt, a SQL injection attempt, a local file inclusion attempt, and a remote file inclusion attempt. In an example, the mode may also include a type of the request, such as a request to load a webpage, to log into an account, to pay for goods, to retrieve data, and/or to run an application etc. In an example, the mode 234 may include a type of the request that on its face is innocuous, such as a request to put an item in a shopping cart or a request to cast a vote in a poll. The intentions behind an action reported as a mode of an abnormality may, in an example, be either benign or malignant. For example, a shopper may legitimately be adding 50 nuts and bolts to their shopping cart one at a time, or the same action may be a sign of a malignant automation such as a script used in a denial-of-service attack. In the example, repeated requests to add an item to a shopping cart may be the mode of an abnormality, and an individual request to add the item to the shopping cart may be the abnormality reported by an application security module to a security policy engine. Similarly, a voter may simply be trying to repeatedly vote for their favorite singer, or someone may be trying to overload the voting system. In some examples, the application security module 142 may be able to detect whether a request is legitimate or a part of a malicious plot, for example, the legitimate shopper will likely attempt to purchase the goods in their shopping cart. In the example, a network controller 170 may not be able to tell whether a transaction is in fact resulting in a sale, and so the benign and malicious acts look similar. In an example, a sophisticated attacker may, for example, attempt to circumvent application security module 142 by simulating failed attempts at paying for goods. In the example, a security policy engine may be able to correlate multiple failed purchase attempts with repeated additions of items to a shopping cart to detect an actionable abnormality where the threshold for taking action, such as blocking the user, by the application security module for the shopping cart and the checkout system may not be independently breached. In an example, application security module 142 may determine that a request includes an abnormality (e.g., a request from a specific requester) due to the frequency of requests from the requester of the request. For example, the requester may be identifiable as a physical person or entity due to user account information, cookies and other browser metadata, or an associated telephone number or address. In an example, user identifying information may be retrieved from an internet service provider of the requester by the application security module 142, the security policy engine 140, or the network controller 170.

The source and the mode are reported to a security policy engine (block 330). In an example, the application security module 142 may report the source 232 and the mode 234 to the security policy engine 140. In an example, the application security module 142 may report information to the security policy engine 140 in a minimalist manner. For example, the reported source 232 may simply be a logged IP address, and the mode 234 may include an attempt to log into an email application 144. In another example, the application security module 142 may interpret the data available to the application security module more and include, for example, the username and/or password that were being used when the abnormality was flagged as part of the mode 234. In another example, the application security module 142 may report to the security policy engine 140 that there is information in a log file that needs to be processed for threat assessment. In an example, the security policy engine 140 may then further interpret the data received to better act on the report, for example, the security policy engine 140 may combine the report from application security module 142 with a report from application security module 242 associated with application 244 which is another copy of the email application to discern that the reported abnormality is in fact part an attack. The security policy engine 140 may determine that an abnormality is a part of an attack based on the pattern of abnormalities observed by security policy engine 140 and/or application security module 142, among several indicators. For example, reports from application security modules (e.g., 142, 245, 242, and 255), the logs of various applications (e.g., 144, 247, 244, and 257), location and internet service provider data interpreted from the source in various reports, and other identifying information. In an example, the security policy engine 140 may identify a plurality of characteristics associated with the source 232 and the mode 234, the characteristics may then be used by the security policy engine 140 and/or the network controller 170 to identify new abnormalities with the same source 232 and/or the same mode 234 as the abnormality reported by application security module 142.

In an example, security policy engine 140 may identify that various reports have been received from different application security modules relating to failed attempts to access an email account, and the login credential may be identified as a characteristic to take action against by the security policy engine 140. In an example, application security module 142 may report that an administrator has logged into an email account from an unknown location, and security policy engine 140 may instruct application security module 245 associated with application 247, a SSH application, that the login for the administrator should be disabled as possibly compromised. In an example, security policy engine 140 may identify that a report from application security module 242 and a report from application security module 142 both share some of the same characteristics, but differ for other characteristics. For example, multiple reports may be received by security policy engine 140, originating from the same block of IP addresses, for example, the same subnet, but not the same IP address, and the security policy engine 140 may cause the network controller 170 to take action against the entire subnet. The security policy engine 140 may also find that multiple reports of abnormalities originate from requests from the same physical location or the same internet service provider account, and take action accordingly to block the location or account from interacting with the applications operated by the tenant 205. In an example, these locations may be the locations where multiple bad actors are acting in conjunction or where a bad actor is attempting to hide the traces of their actions. The security policy engine 140 may, for example, correlate the various reports due to attempts to access the same login credentials, or for example, a commonality in the requests sent to the applications associated with the application security modules, such as adding the same items to a shopping cart. In an example, a characteristic may be an IP address, a MAC address, a physical location, a phone number, a domain, a subnet, a login credential, a password, a database, a database table, a URL, a command, a query, a unique identifier, a message, contents of a message, a size of request, user identifying information, or a frequency of request.

In response to receiving a report with the source and the mode, the security policy engine prevents a further abnormality from the source and/or the mode from affecting a second application (block 340). In an example, security policy engine 140 may prevent an abnormality with source 232 and/or mode 234 from affecting application 247 on the same virtual machine 112 as reporting application 144, application 244 which is another copy of reporting application 144 but on a different virtual machine 212, and/or application 257 which is a different application from application 144 and on a different virtual machine 212. In an example, security policy engine 140 may notify application security modules 245, 242, and 255 of the mode 234 and/or characteristics of the reported abnormality to have the application security modules 245, 242, and 255 prevent a further abnormality in the respective applications 247, 244 and 257. In an example, there may be an authentication application or database such as LDAP 227 in tenant 205's system associated with a plurality of virtual machines such as virtual machines 112, 116 and 212, and the security policy engine 140 may disable one or more login credentials and/or groups of login credentials in LDAP 227 to prevent further access by the same login credentials, and thereby preventing some potential abnormalities of a common source. In another example, security policy engine 140 may adjust certain thresholds for detecting abnormalities in application security modules 142, 245, 242, and 255 to make the application security modules 142, 245, 242, and 255 more sensitive to abnormalities with the same or a similar mode as mode 234, or for abnormalities with similar characteristics to a characteristic of the reported abnormality. In an example, the security policy engine 140 may also notify another security policy engine operated by the tenant 205 that is operating in a different multi-tenant cloud from multi-tenant cloud 270 of the abnormality, including any information regarding the source, mode, and characteristics of the abnormality. In the example, the second security policy engine in the second multi-tenant cloud may take similar actions to security policy engine 140 to prevent abnormalities from affecting applications operated by the tenant 205 in the second multi-tenant cloud.

The security policy engine commands a network controller to prevent the source from interacting with a network (block 350). In an example, network controller 170 may be commanded by the security policy engine 140 to prevent communications from the source 232 from communicating with the multi-tenant cloud 270. In the example, the network controller 170 may, in response to the command from security policy engine 140, block communication between the source and the virtual machines (e.g., 112, 116 and 212) or other isolated guests such as containers operated by tenant 205, the virtual machines (e.g., 282 and 284) operated by a second tenant 210, or all virtual machines operating in the multi-tenant cloud 270. In an example, the network controller 170 may block communications with the source 232 based on a characteristic of the source (e.g., an IP address, a MAC address, a physical location, a phone number, a domain, a subnet).

In a further example, security policy engine 140 may notify network controller 170 of the mode, the source, some characteristics, and/or the existence of the abnormality. In an example, the network controller 170 may in turn notify a security policy engine of a different tenant, for example, security policy engine 240 of tenant 210 of the mode 234, the source 232, the characteristics and/or the existence of the abnormality. In an example, security policy engine 240 may take actions similar to security policy engine 140 such as disabling login credentials or modifying the reporting thresholds of tenant 210's application security modules 260 and 265 in response to the notification from the network controller 170. In an example, the security policy engine 240 may instruct application security modules 260 and 265 to block or ignore requests from a specific login credential.

In an example, the security policy engine 140 may notify the network controller of a different multi-tenant cloud of the abnormality, the source 232, the mode 234 or a characteristic of the abnormality. In an example, the security policy engine 140, or a similar security policy engine operated by tenant 205 in the second multi-tenant cloud may command the network controller of the second multi-tenant cloud to block communications between tenant 205's isolated guests in the second multi-tenant cloud and the source 232. In an example, the second network controller may block all communications between the source and the second multi-tenant cloud. In the example, the network controller 170 may respond to different types of commands from the second network controller, for example, the two network controllers may use different proprietary APIs associated with the different cloud providers. In an example, tenant 205 may quickly propagate security threats between all of the cloud providers utilized by tenant 205 that have a version of security policy engine 140 running, and the same security policy 140 may command a variety of different network controllers with different APIs. In the example, programmers programming applications such as application 144 may be insulated from the varying network controller APIs and may create one notification and threat detection system implemented via application security module 142 and security policy engine 140, and the application 144 and application security module 142 may be portable between many multi-tenant cloud providers. In an example, security policy engine 140 may provide dynamic security policy provisioning (e.g., commanding network controller 170 and LDAP 227 to block access) based on stateful application level inspection for security threats provided by application security module 142 in multi-tenant cloud 270.

Figure 4:
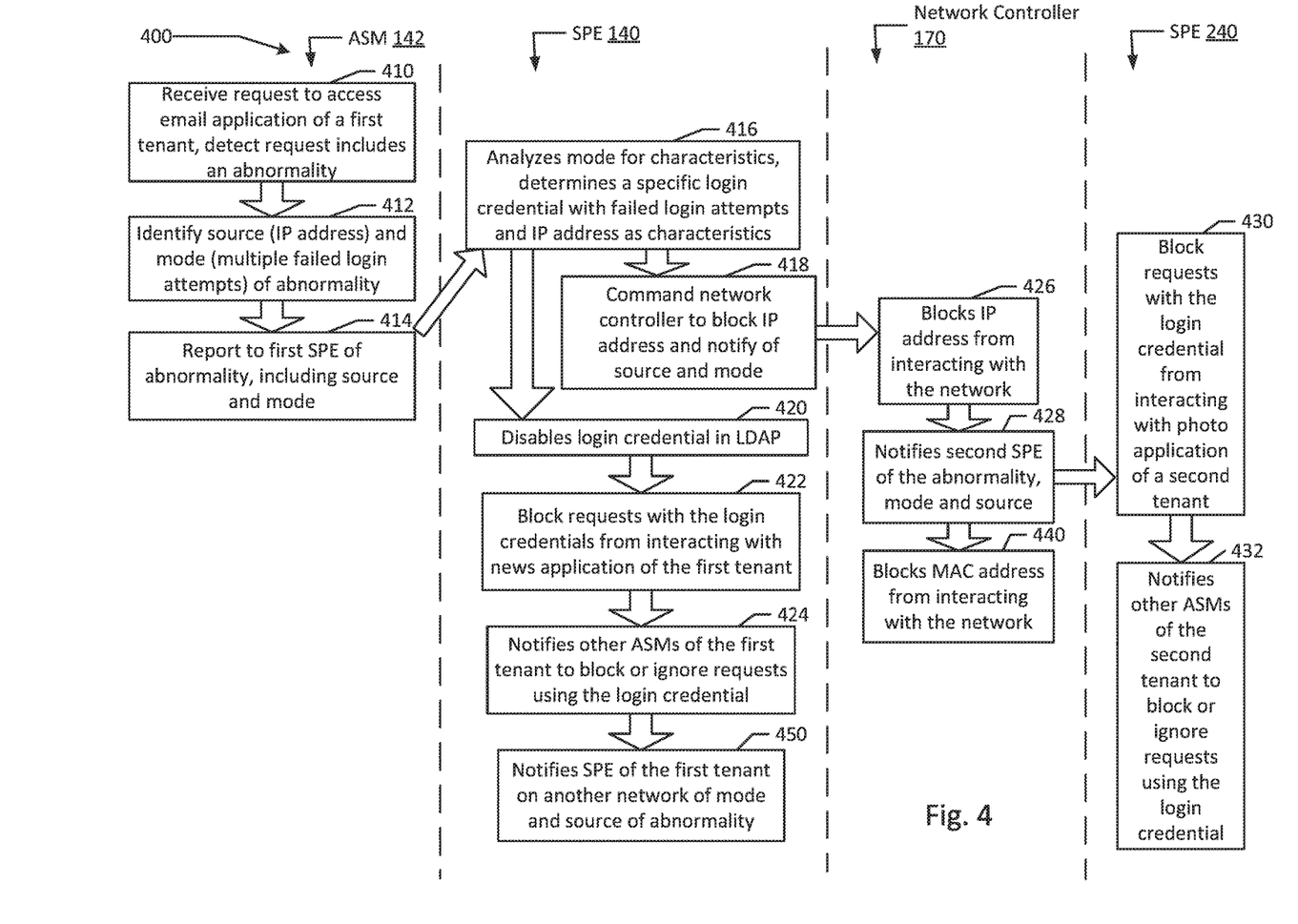
FIG. 4 is a flow diagram illustrating an example security policy engine system responding to a security threat according to an example of the present disclosure.

FIG. 4 depicts a flow diagram illustrating an example security policy engine system responding to a security threat according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, the security policy engine 140 is in communication with application security module 142 and network controller 170, while network controller 170 is also in communication with security policy engine 240.

In an example, application security module 142 may receive a request to access an email application of a first tenant, for example, as a filter for requests to access the email application, and application security module 142 may detect that the request includes abnormality (block 410). In an example, application security module 142 may identify the source of the abnormality as the IP address of the request, and a mode of the abnormality as multiple failed login attempts (block 412). In the example, the abnormality may be the IP address, the login credential, and/or a characteristic shared by the requests such as a common size or computed hash value. Having identified the source and the mode of the abnormality, the application security module 142 may send a report of the abnormality including the source and the mode to security policy engine 140 (block 414).

In an example, security policy engine 140 may analyze the mode for characteristics, and may determine that a specific login credential with failed login attempts as a characteristic and the IP address of the source as a second characteristic (block 416). In an example, the security engine 140 may start two separate responses to the abnormality. First, the security policy engine may disable the login credential in LDAP 227 (block 420). In an example, security policy engine 140 may disable a credential in LDAP 227 to prevent the login credential from functioning in any other system operated by the same tenant, for example, tenant 205. Security policy engine 140 may also block requests with the same login credentials from interacting with a news application 245 of the first tenant (block 422). Security policy engine 140 may, in an example, achieve blocking requests from the same login credentials from interacting with news application 245 by disabling the login credential in LDAP 227. Security policy engine 140 may further notify more application security modules, for example, application security modules 245 and 255 to ignore requests including the same login credential as the login credentials in the report (block 424). In another example, security policy engine 140 may notify another security policy engine of tenant 205 located on another multi-tenant cloud of the mode and the source of the abnormality (block 450). In an example, the new security policy engine may take similar actions as security policy engine 140 to prevent an abnormality from affecting the isolated guests of the second multi-tenant cloud, specifically the isolated guests operated by tenant 205.

Second, the security policy engine 140 may command the network controller 170 to block the IP address of the request from interacting with the network, and notify the network controller 170 of the source and the mode of the abnormality (block 418). The network controller 170 may then block the IP address of the request from interacting with the network (block 426). In an example, the network controller 170 may block the IP address of the request from interacting with a network (e.g., multi-tenant cloud 270. In another example, the network controller 170 may block the IP address of the request from interacting with any or all systems within the multi-tenant cloud 270, owned by a specific tenant (e.g., tenants 205 and 210), or with specific isolated guests. In an example, network controller 170 also notifies security policy engine 240 of the abnormality, its mode and its source (block 428). The network controller 170 may also block the MAC address corresponding to the IP address blocked above from interacting with the network (block 440). In an example, a bad actor may attempt to circumvent an IP block by changing their IP address but fail to hide their MAC address. In an example, upon being notified by the network controller 170, the security policy engine 240 may block requests with the login credentials identified by application security module 142 from interacting with a second tenant's (e.g., tenant 210) photo storage and sharing application (block 430). In an example, tenants 205 and 210 may be divisions of the same company and shared logins may be common, in another example, tenants 210 may have implemented an authentication method allowing tenant 205 to provide authentication services for tenant 210. In an example, tenant 210 may decide to block a user name that is also an email address if the email address was flagged as an abnormality by application security module 142, even if tenant 205 and tenant 210 are unrelated entities. In an example, security policy engine 240 may also notify application security modules 260 and 265 to block or ignore requests using the login credential (block 432). In an example, an application security module may receive a request to filter and flag for abnormalities simultaneously with or even before its associated application receives the request.

In an example, a malicious actor may obtain access to a company executive's personal email account through, for example, social engineering, and may use the email account to request an administrator password from an engineer for an application or database hosted in a multi-tenant cloud. In the example, the engineer may respond with login credentials. However, when the malicious actor attempts to log in, the application security module for the SSH application may flag that the administrator account is being logged into from an unusual location, for example, Nigeria, and the application security module may report the source of the access (e.g., Nigeria) and the mode (e.g., administrator login) to a security policy engine. The security policy engine may interpret the reported abnormality as part of an attack and disable the administrator account in LDAP, or the security policy engine may send out a warning for an administrator to inspect the unusual access. The security policy engine may also block access to an email account associated with the administrator account to prevent further social engineering attempts against the administrator.

Figure 5:
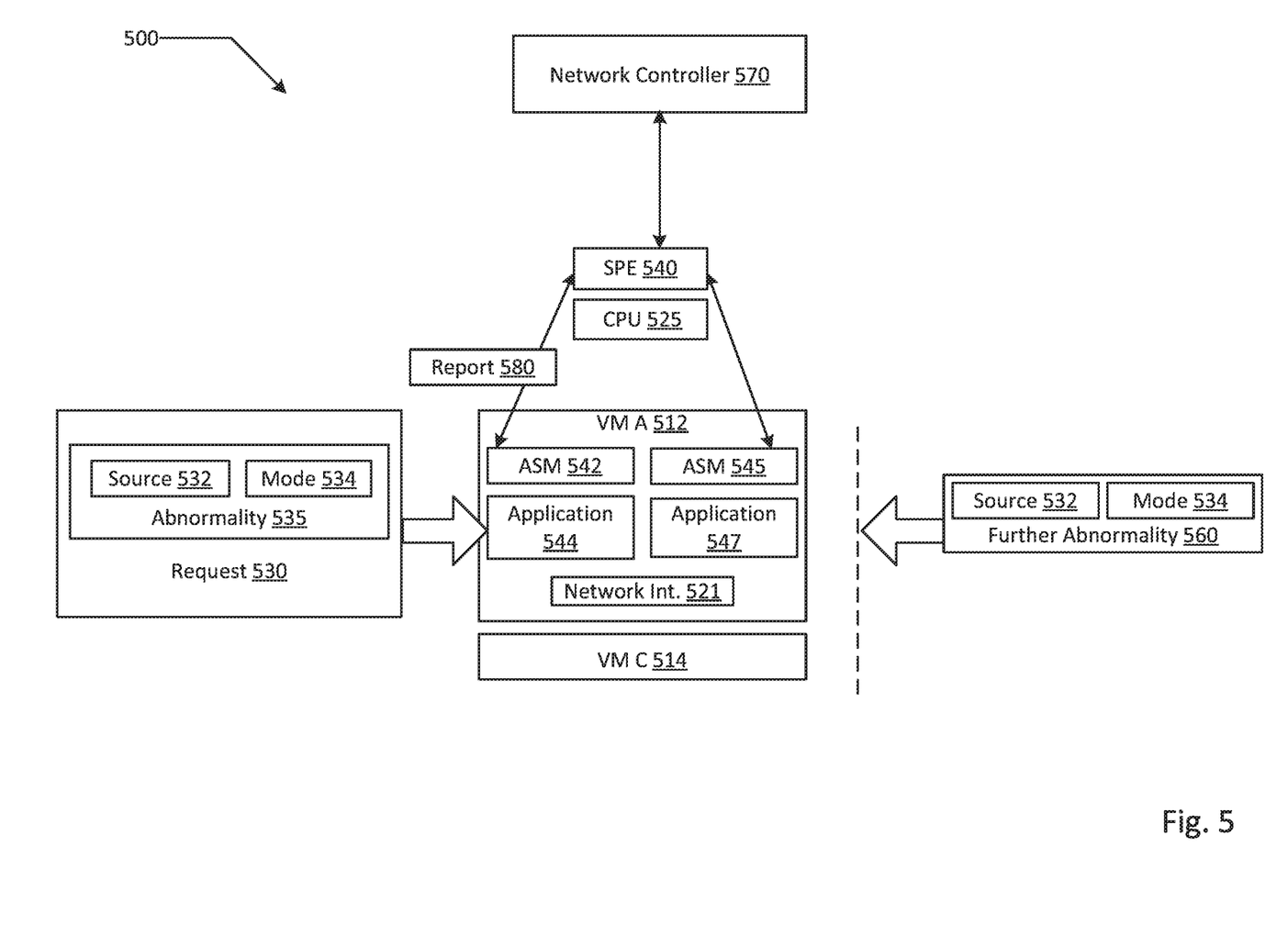
FIG. 5 is a block diagram of an example security threat detection and response system according to an example of the present disclosure.

FIG. 5 depicts a block diagram of an example security threat detection and response system according to an example of the present disclosure. Example network system 500 comprises a plurality of virtual machines 512 and 514. The virtual machine 512 includes applications 544 and 547 and application security modules 542 and 545. Application 544 is associated with application security module 542 and application 547 is associated with application security module 545. In an example, VM 512 may also communicate with other systems via a network interface 521. In the example, network controller 570 may be associated with network 500, and network 500 may be a multi-tenant cloud. Network controller 570 may be in communication with one or more processors 525, on which a security policy engine 540 is executing.

In an example, the application security module 542 detects an abnormality 535 with a request 530 to the application 544. In an example, the application security module 542 identifies a source 532 and a mode 534 of the abnormality 530. The application security module 542 may then report the source 532 and the mode 534 to the security policy engine 540. Responsive to receiving a report 580 with source 532 and mode 534 from the application security module 542, the security policy engine 540 prevents a further abnormality 560 with the source 562 and/or the mode 564 from affecting the application 547. In an example, security policy engine 540 may block a user account used by further abnormality 560, or may block further attempts to access application 544 more than once every few seconds. In an example, security policy engine 540 may also command network controller 570 to prevent the source 532 from interacting with the network 500, for example by blocking further abnormality 560 by blocking the IP address of the request.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor; and
a first security policy engine (SPE) configured to execute on the processor to:
communicate with a plurality of application security modules including a first application security module (ASM), wherein the first ASM is configured to detect abnormalities for a first application, identify a source and a mode of a first abnormality, and determine that the first abnormality individually does not meet a first threshold for taking an action, wherein each of the abnormalities is identifiable with at least a respective threshold of a respective mode;
receive, from the first ASM, the source and the mode;
correlate a plurality of abnormalities including the first abnormality; and
adjust a second threshold used by a second ASM associated with a different second application for detecting the mode, such that the second ASM is configured to detect a second abnormality with the mode and prevent the second application from being affected by the second abnormality.

2. The system of claim 1, wherein the mode includes an identifying characteristic, which enables additional abnormalities associated with additional requests to be detected, the identifying characteristic including at least one of an IP address, a MAC address, a physical location, a phone number, a domain, a subnet, a login credential, a password, a database, a database table, a URL, a command, a query, a unique identifier, a message, contents of a message, a size of request, user identifying information, or a frequency of request.

3. The system of claim 1, wherein an authentication application is associated with a first plurality of virtual machines, and the first SPE disables a login credential for authenticating with applications executing on the first plurality of virtual machines in response to receiving a report with the source and the mode.

4. The system of claim 1, wherein the mode includes at least one of a traffic surge, an invalid login credential, a login from an unknown device, identified malware, a phishing attempt, a password attack, a denial-of-service attack, a cross site scripting attempt, a sql injection attempt, a local file inclusion attempt, or a remote file inclusion attempt.

5. The system of claim 1, wherein the second application is dynamically launched after the first SPE receives the source and the mode from the first ASM.

6. The system of claim 1, wherein the first ASM identifies the first abnormality based on a frequency of requests from a requester, and notifies the first SPE of an identifying feature of the requester.

7. The system of claim 1, further comprising a first network controller, wherein a first virtual machine executing the first ASM is connected to a first network, which is managed by the first network controller, and the first SPE is configured to notify the first network controller of at least one of the mode, the source, an identifying characteristic, or an occurrence of the first abnormality.

8. The system of claim 7, wherein the first ASM determines whether a request, transmitted over the first network controller to the first application, has a first status based on other requests from a requester of the request, the first status being mutually exclusive from a second status, and wherein requests detected as having the first status and having the second status are indistinguishable to the first network controller.

9. The system of claim 7, wherein the first network controller is associated with a first plurality of virtual machines, and the first network controller notifies a second SPE associated with a different second plurality of virtual machines of at least one of the mode, the source, the identifying characteristic, and the occurrence of the first abnormality; and
the second SPE configures a third ASM to detect a third abnormality with the mode, preventing a third application from being affected by the third abnormality.

10. The system of claim 9, further comprising a plurality of SPEs, the plurality of SPEs including the second SPE,
wherein the first SPE is utilized by a first tenant to protect the first tenant's applications, and the second SPE is utilized by a second tenant to protect the second tenant's applications.

11. The system of claim 7, further comprising a second network controller associated with a different second network, wherein the first SPE commands the second network controller to prevent the source from interacting with the second network.

12. The system of claim 11, wherein the first network controller accepts commands via a first application programming interface and the second network controller accepts commands via a different second application programming interface.

13. The system of claim 7, wherein the first network controller blocks communication between the source and at least one of a first plurality of virtual machines associated with a first tenant, a second plurality of virtual machines associated with a second tenant, or all virtual machines connected to the first network.

14. The system of claim 1, further comprising a second SPE.

15. A method comprising:
communicating with a plurality of application security modules including a first application security module (ASM), wherein the first ASM is configured to detect abnormalities for a first application, identify a source and a mode of a first abnormality, and determine that the first abnormality individually does not meet a first threshold for taking an action, wherein each of the abnormalities is identifiable with at least a respective threshold of a respective mode;
receiving, from the first ASM, the source and the mode;
correlating a plurality of abnormalities including the first abnormality; and
adjusting a second threshold used by a second ASM associated with a different second application for detecting the mode, such that the second ASM is configured to detect a second abnormality with the mode and prevent the second application from being affected by the second abnormality.

16. The method of claim 15, wherein an authentication application is associated with a plurality of virtual machines that includes a first virtual machine, which is configured to execute the first ASM, the method further comprising:
disabling a login credential for authenticating with applications executing on the plurality of virtual machines in response to receiving the source and the mode which were reported by the first ASM.

17. The method of claim 15, further comprising receiving a notification of an identifying feature of a requester from the first ASM after the first abnormality is identified based on a frequency of requests from the requester.

18. The method of claim 15, wherein a first virtual machine configured to execute the first ASM is connected to a network, which is managed by a network controller, the method further comprising:
notifying the network controller of at least one of the mode, the source, an identifying characteristic, or an occurrence of the first abnormality.

19. The method of claim 18, further comprising:
blocking, by the network controller, communication between the source and at least one of a first plurality of virtual machines associated with a first tenant, a second plurality of virtual machines associated with a second tenant, or all virtual machines connected to the network.

20. A computer-readable non-transitory storage medium storing executable instructions, which when executed by a computer system, cause the computer system to:
communicate with a plurality of application security modules including a first application security module (ASM), wherein the first ASM is configured to detect abnormalities for a first application, identify a source and a mode of a first abnormality, and determine that the first abnormality individually does not meet a first threshold for taking an action, wherein each of the abnormalities is identifiable with at least a respective threshold of a respective mode;
receive, from the first ASM, the source and the mode;
correlate a plurality of abnormalities including the first abnormality; and
adjust a second threshold used by a second ASM associated with a different second application for detecting the mode, such that the second ASM is configured to detect a second abnormality with the mode and prevent the second application from being affected by the second abnormality.

* * * * *